United States Patent Office 2,921,086
Patented Jan. 12, 1960

2,921,086

ORGANOPHOSPHORUS COMPOUNDS DERIVED FROM PHOSPHOROTHIOLOTHIONATES AND EPOXIDES

Marvin A. McCall and Richard L. McConnell, Kingsport, Tenn., assignors to Eastman Kodak Company, Rochester, N.Y., a corporation of New Jersey No Drawing. Application August 12, 1957
Serial No. 677,758

6 Claims. (Cl. 260—461)

This invention relates to new organophosphorus compounds and to their method of preparation. In a specific aspect this invention relates to the preparation of new organophosphorus compounds by the reaction of dialkyl phosphorothiolothionates with certain epoxy compounds and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention is has been found that new organophosphorus compounds, useful as insecticides, can be prepared by reacting dialkyl phosphorothiolothionates with certain epoxides. The new products of this invention have the structural formula:

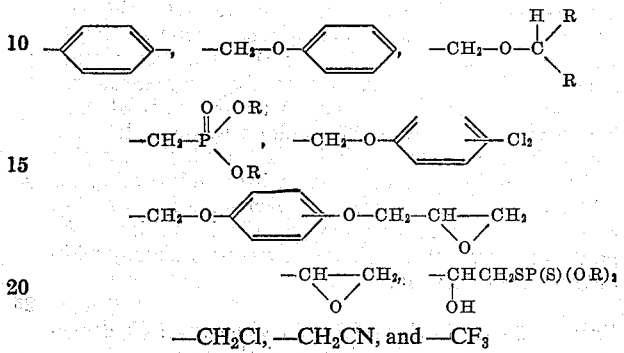

wherein $R_1$ is selected from the group consisting of the following organic radicals:

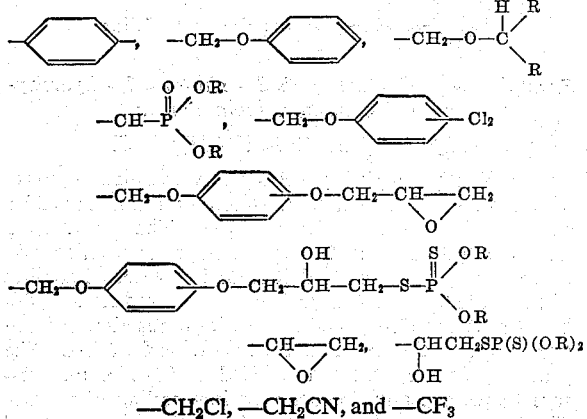

$-CH_2Cl$, $-CH_2CN$, and $-CF_3$

In the above structural formula and in the definition of $R_1$, R is a lower alkyl radical containing from 1 to 4 carbon atoms.

In preparing the products of this invention, dialkyl phosphorothiolothionates having the following structural formula are used:

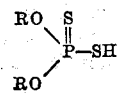

wherein R is a lower alkyl radical containing from 1 to 4 carbon atoms. The epoxides that are used in preparing the compounds of this invention have the structural formula:

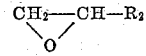

wherein $R_2$ is selected from the group consisting of:

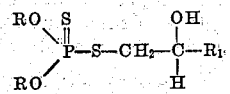

$-CH_2Cl$, $-CH_2CN$, and $-CF_3$ wherein R is as defined above.

In the practice of this invention we prefer to add one of the reactants gradually to a reactor containing the other reactant. For example, the epoxide can be added gradually to a reactor containing the dialkylphosphorothiolothionate. Alternatively however, the reverse procedure of addition of reactants can be used and the dialkylphosphorothiolothionate can be added to a reactor containing the epoxide. Normally it is desirable to employ a reactor provided with adequate means of agitation and, since the reaction is quite exothermic, it is also desirable to employ a reactor that is provided with adequate cooling means.

The operable temperature range for the reaction is generally from 0 to 160° C. and the preferred temperature range is from 25 to 100° C. However, it will be realized that in some instances temperatures outside this range can be employed. The reaction time usually varies from 0.5 to 8 hours, but longer and shorter reaction periods are sometimes used. Normally it is unnecessary to employ a catalyst for the reaction since the dialkylphosphorothiolothionate will react with the epoxide to open the epoxy ring in the absence of a catalyst. If it is considered desirable to employ a catalyst, there are certain catalysts that can be used. For example, the tertiary amines, such as triethyl amine, and the like, and etherates of boron trifluoride.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. This is particularly true when the epoxide contains only a single epoxy ring and no unsaturated radicals attached to the cyclohexyl ring. In those instances where the epoxide contains two epoxy rings or one or more unsaturated radicals attached to the cyclohexyl ring radicals, it is desirable to use two or more moles of the dialkyl phosphorothiolothionate per mole of the epoxide.

The dialkylphosphorothiolothionates that are used in our invention can be prepared by the known reaction of 4 moles of an aliphatic alcohol with one mole of phosphorus pentasulfide. The epoxides that are used in our reaction can be prepared from the corresponding olefin by oxidation in the presence of peracids, such as perbenzoic or peracetic acid. Alternatively, the epoxides can be prepared by the dehydrohalogenation of the corresponding halohydrin.

The following examples are illustrative of the compounds within the scope of this invention, their method of preparation and their utility as insecticides.

*Example 1.—O,O-dimethyl S-(2-phenyl-2-hydroxyethyl)- phosphorothiolothionate*

$$(CH_3O)_2P(S)SCH_2CH(OH)C_6H_5$$

O,O-dimethyl phosphorothiolothionate (0.1 mole, neutral equivalent 190) was added gradually with stirring to 1,2-epoxyethyl benzene (0.1 mole). The temperature rose rapidly to 50–70° C. The exothermic reaction was controlled by the rate of addition and by external cooling when needed. After the addition was complete and the initial heat of reaction had subsided, the reaction mixture was heated on the steam bath with stirring for 2 hours. The product was then vacuum stripped at 1–2 mm. pressure to remove any volatile impurities. The product is a transparent oil which was used directly without further purification.

*Example 2.—O,O - dibutyl S - (3 - phenoxy - 2 - hydroxypropyl) phosphorothiolothionate*

$$(C_4H_9O)_2P(S)SCH_2CH(OH)CH_2OC_6H_5$$

O,O-dibutyl phosphorothiolothionate (0.1 mole, neutral equivalent 269) was added dropwise with stirring to 1,2-epoxy-3-phenoxypropane (0.1 mole) and 25 cc. dry benzene as diluent or solvent. The reaction was exothermic and was carried out in the same manner as described in Example 1. The benzene solvent was removed by vacuum stripping leaving a viscous oil.

*Example 3.—O,O - diethyl S - (3 - isopropoxy - 2 - hydroxypropyl) phosphorothiolothionate*

$$(C_2H_5O)_2P(S)SCH_2CHCH_2OCH(CH_3)_2$$
$$\phantom{(C_2H_5O)_2P(S)SCH_2C}|\phantom{H_2OCH(CH_3)_2}$$
$$\phantom{(C_2H_5O)_2P(S)SCH_2C}OH$$

1,2-epoxy-3-isopropoxy propane (0.1 mole) and 25 cc. of diethyl ether as diluent and 5 drops of triethylamine as catalyst were added dropwise with stirring to O,O-diethyl phosphorothiolothionate (0.1 mole, neutral equivalent 210). The reaction was exothermic and was worked up in the same manner as described in Example 1.

*Example 4.—O,O - diethyl S - (3 - diethylphosphono - 2 - hydroxypropyl) phosphorothiolothionate*

$$(C_2H_5O)_2P(S)SCH_2CH(OH)CH_2P(O)(OC_2H_5)_2$$

Diethyl 2,3-epoxypropylphosphonate (0.1 mole) was added dropwise with stirring to O,O-diethyl phosphorothiolothionate (0.1 mole, neutral equivalent 210). The reaction was exothermic and processed in the same manner as that described in Example 1.

*Example 5.—O,O-diethyl S{3-(2,4 - dichlorophenoxy)-2- hydroxypropyl}phosphorothiolothionate*

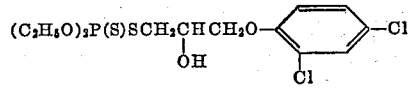

1,2-epoxy-3(2,4-dichlorophenoxy)propane (0.1 mole) was added dropwise with stirring to O,O-diethyl phosphorothiolothionate (0.1 mole). The reaction was processed in the same manner as described in Example 1. The product is a transparent, colorless oil, $n_D^{20}$ 1.5628.

*Example 6.—O,O - diethyl S{3 - [p(2,3 - epoxypropoxyphenoxy)] - 2 - hydroxypropyl}phosphorothiolothionate*

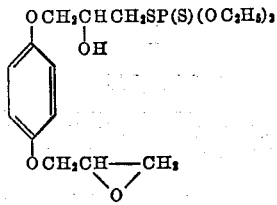

This compound was prepared from O,O-diethyl phosphorothiolothionate (0.1 mole, neutral equivalent 210), and 1,4-bis (2,3-epoxypropoxy)benzene (0.1 mole) dissolved in 100 cc. benzene solvent. The procedure was the same as that given in Example 1. The benzene was removed under reduced pressure after the reaction was completed leaving a viscous light yellow oil.

In like manner when two mole equivalents of diethyl phosphorothiolothionate was used, a diadduct represented by the following formula was obtained.

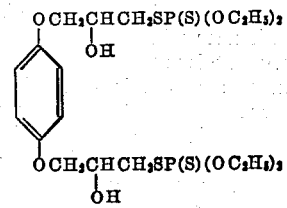

*Example 7.—O,O - diethyl S{3[m(2,3 - epoxypropoxyphenoxy)] - 2 - hydroxypropyl}phosphorothiolothionate*

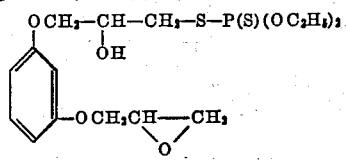

This product was obtained from O,O-diethyl phosphorothiolothionate (0.1 mole, neutral equivalent 210) and 1,3-bis(2,3-epoxypropoxy)benzene (0.1 mole) dissolved in benzene. The procedure was the same as that of Examples 1 and 6. The diaddition product was also obtained when two mole equivalents of diethyl phosphorothiolothionate was used. The diadduct had the following formula:

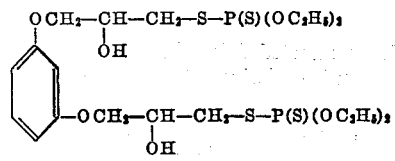

*Example 8.—O,O - diethyl S(3 - chloro - 2 - hydroxypropyl) phosphorothiolothionate*

$$(C_2H_5O)_2P(S)SCH_2CH(OH)CH_2Cl$$

Epichlorohydrin (9.3 g., 0.1 mole) was added dropwise with stirring to O,O-diethyl phosphorothiolothionate (20.8 g., 0.1 mole, neutral equivalent 210). The temperature rose rapidly to 50–70° C. The exothermic reaction was controlled by the rate of addition and by external cooling when needed. After the addition was complete and the initial heat of reaction had subsided, the reaction mixture was heated on the steam bath with stirring for 2 hrs. The product was then vacuum stripped at 10–25 mm. pressure to remove any unreacted or low boiling impurities. The product was a light straw colored oil which was used directly without further purification.

*Example 9.—O,O - diethyl S(3 - cyano - 2 - hydroxypropyl) phosphorothiolothionate*

$$(C_2H_5O)_2P(S)SCH_2CH(OH)CH_2CN$$

Epicyanohydrin (8.3 g., 0.1 mole) was added dropwise with stirring to O,O-diethyl phosphorothiolothionate (20.8 g., 0.1 mole, neutral equivalent 210). The reaction was exothermic and was processed in the same manner as described in Example 8.

*Example 10.—O,O - diethyl S(1,4 - dichloro - 3 - hydroxy - 2 - butyl)phosphorothiolothionate*

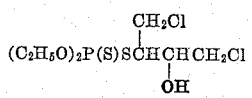

1,4-dichloro-2,3-epoxybutane (12.5 g., 0.1 mole) was added dropwise with stirring to O,O-diethyl phosphorothiolothionate (20.8 g., 0.1 mole, neutral equivalent 210). The product was obtained as a light yellow oil by the same reaction process as described in Example 8.

*Example 11.—O,O - diethyl S - (3,3,3 - trifluoro - 2 - hydroxypropyl)phosphorothiolothionate*

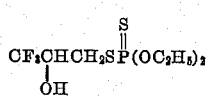

This compound was prepared from 1,1,1-trifluoro-2,3-epoxypropane (11.2 g., 0.1 mole) and diethyl phosphorothiolothionate (20.8 g., 0.1 mole, neutral equivalent 210) by the procedure given in Example 8.

*Example 12.—O,O-diethyl S-(3,4-epoxy-2-hydroxybutyl) phosphorothiolothionate*

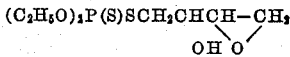

This compound was prepared from diethyl phosphorothiolothionate (0.1 mole) and butadiene dioxide (0.1 mole) according to the procedure of Example 1. It is a straw colored oil.

*Example 13.—2,3-dihydroxybutane-1,4-dithiol S,S-bis-(O,O-diethyl phosphorothiolothionate)*

This viscous oil was obtained from diethyl phosphorothiolothionate (0.1 mole) and butadiene dioxide (0.2 mole) according to the procedure of Example 6.

*Example 14*

The usefulness of the above compounds as insecticides is illustrated in experiments using mites in the following manner. Acetone solutions containing 5% of the candidate compounds were prepared and diluted with water to give a solution containing the desired concentration for testing. Two heavily infested bean leaves containing adult two-spotted mites (*T. bimaculatus*) were carefully dipped in the above solutions and dried in a gentle air stream. The leaves were then placed on damp paper toweling in Petri dishes and observed after 24 hrs. for mortality among adult mites. It should be noted that tests using acetone-water solutions (containing none of the toxicant) kill none of the mites.

| Run | Concentration in p.p.m. | Percent Kill, Mites |
|---|---|---|
| 1. Blank | 0 | 0 |
| 2. O,O-Diethyl S-(3-chloro-2-hydroxypropyl) phosphorothiolothionate | 1,000 | 100 |
|  | 100 | 97 |
|  | 30 | 83 |
| 3. 2,3-Dihydroxybutane-1,4-dithiol S,S-bis(O,O-diethyl phosphorothiolothionate) | 1,000 | 100 |
|  | 100 | 100 |
|  | 30 | 70 |
| 4. O,O-Diethyl S[3-(2,4-dichlorophenoxy)-2-hydroxypropyl] phosphorothiolothionate | 1,000 | 100 |
|  | 100 | 70 |

The compounds illustrated by the other examples of the invention were equally effective when tested against mites.

We claim:
1. As a composition of matter, O,O-diethyl S-[3-(2,4-dichlorophenoxy)-2-hydroxypropyl] phosphorothiolothionate.
2. As a composition of matter, the organophosphorus compounds having the structural formula:

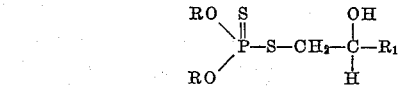

wherein $R_1$ is selected from the group consisting of

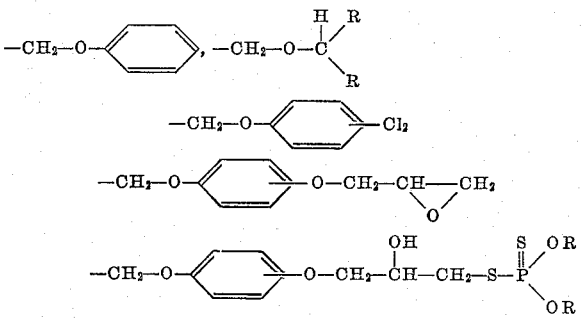

and wherein R in said structural formula and in the definition of $R_1$ is a lower alkyl radical containing 1 to 4 carbon atoms.
3. As a composition of matter, O,O-dibutyl S-(3-phenoxy-2-hydroxypropyl)phosphorothiolothionate.
4. As a composition of matter, O,O-diethyl S-(3-isopropoxy-2-hydroxypropyl) phosphorothiolothionate.
5. As a composition of matter, O,O-diethyl S{3-[p(2,3-epoxypropoxyphenoxy)]-2-hydroxypropyl}phosphorothiolothionate.
6. As a composition of matter, O,O-diethyl S{3[m(2,3-epoxypropoxyphenoxy)]-2-hydroxypropyl}phosphorothiolothionate.

References Cited in the file of this patent
UNITED STATES PATENTS

| 2,783,202 | McDermott | Feb. 26, 1957 |
| 2,783,203 | McDermott | Feb. 26, 1957 |

OTHER REFERENCES

Fischer et al.: German application Serial No. D. 18,787, printed March 8, 1956.